(12) United States Patent
Fukuda et al.

(10) Patent No.: US 10,186,736 B2
(45) Date of Patent: Jan. 22, 2019

(54) DEFORMATION DETECTION METHOD FOR A SEALED-TYPE RECHARGEABLE BATTERY AND SEALED-TYPE RECHARGEABLE BATTERY

(71) Applicant: TOYO TIRE & RUBBER CO., LTD., Osaka-shi, Osaka (JP)

(72) Inventors: Takeshi Fukuda, Osaka (JP); Nobuyuki Minakata, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 100 days.

(21) Appl. No.: 15/315,187

(22) PCT Filed: Apr. 10, 2015

(86) PCT No.: PCT/JP2015/061264
§ 371 (c)(1),
(2) Date: Nov. 30, 2016

(87) PCT Pub. No.: WO2016/006293
PCT Pub. Date: Jan. 14, 2016

(65) Prior Publication Data
US 2017/0200986 A1    Jul. 13, 2017

(30) Foreign Application Priority Data

Jul. 8, 2014 (JP) .................. 2014-140307
Nov. 27, 2014 (JP) .................. 2014-240176

(51) Int. Cl.
*H01M 2/02* (2006.01)
*H01M 10/48* (2006.01)
(Continued)

(52) U.S. Cl.
CPC .............. *H01M 10/48* (2013.01); *G01B 7/24* (2013.01); *H01M 2/0267* (2013.01);
(Continued)

(58) Field of Classification Search
CPC ..................................................... H01M 2/00
See application file for complete search history.

(56) References Cited

U.S. PATENT DOCUMENTS

2012/0148890 A1    6/2012  Goto et al.
2012/0177958 A1*   7/2012  Tsutsumi .............. H01M 2/024
                                                429/53
(Continued)

FOREIGN PATENT DOCUMENTS

CN      103229347 A    7/2013
JP      2003-59484 A   2/2003
(Continued)

OTHER PUBLICATIONS

Notification of Transmittal of Translation of the International Preliminary Report on Patentability (Form PCT/IB/338) issued in counterpart International Application No. PCT/JP2015/061264 dated Jan. 19, 2017, with Forms PCT/IB/373 and PCT/ISA/237. (7 pages).
(Continued)

*Primary Examiner* — Jacob B Marks
(74) *Attorney, Agent, or Firm* — Westerman, Hattori, Daniels & Adrian, LLP

(57) ABSTRACT

In a deformation detection method for a sealed-type rechargeable battery 1 in which an electrode group 22, which is formed by stacking a positive electrode 23 and a negative electrode 24 with a separator 25 interposed therebetween, is accommodated in a sealed outer casing 21, a polymer matrix layer 3 is attached to an outer surface of a wall portion 28a of the outer casing 21 that faces the electrode group 22 in a thickness direction of the positive electrode 23 and the negative electrode 24 or in a direction perpendicular to the thickness direction. The polymer matrix layer 3 contains a filler that is dispersed therein and that changes an external field in response to deformation of the polymer matrix layer 3. Change in the external field accom-
(Continued)

panying the deformation of the polymer matrix layer 3 is detected by a detection unit 4.

7 Claims, 11 Drawing Sheets

(51) Int. Cl.
 *G01B 7/24* (2006.01)
 *H01M 10/0525* (2010.01)
 *H01M 10/0587* (2010.01)
 *H01M 10/0585* (2010.01)

(52) U.S. Cl.
 CPC ..... *H01M 2/0295* (2013.01); *H01M 10/0525* (2013.01); *H01M 10/0587* (2013.01); *H01M 10/0585* (2013.01); *Y02T 10/7011* (2013.01)

(56) References Cited

U.S. PATENT DOCUMENTS

| | | | |
|---|---|---|---|
| 2013/0089765 | A1 | 4/2013 | Murayama et al. |
| 2015/0253207 | A1 | 9/2015 | Shigeto et al. |

FOREIGN PATENT DOCUMENTS

| | | | |
|---|---|---|---|
| JP | 2005-63736 | A | 3/2005 |
| JP | 2009-76265 | A | 4/2009 |
| JP | 2011-198511 | A | 10/2011 |
| JP | 2012-234629 | A | 11/2012 |
| JP | 2014-098688 | * | 5/2014 |
| JP | 2014-98688 | A | 5/2014 |
| WO | 2012/073770 | A1 | 6/2012 |

OTHER PUBLICATIONS

Office Action dated Jun. 27, 2017, issued in counterpart Japanese Application No. 2014-240176, with English translation. (4 pages).
Office Action dated Oct. 23, 2017, issued in counterpart Korean Application No. 10-2016-7035733, with English translation (12 pages).
International Search Report dated May 19, 2015, issued in counterpart International Application No. PCT/JP2015/061264 (2 pages).
Office Action dated Jun. 6, 2016, issued in counterpart of Taiwan Patent Application No. 104111906 with English Translation (9 pages).

\* cited by examiner

DEFORMATION DETECTION METHOD FOR A SEALED-TYPE RECHARGEABLE BATTERY AND SEALED-TYPE RECHARGEABLE BATTERY

TECHNICAL FIELD

The present invention relates to a deformation detection method for a sealed-type rechargeable battery in which an electrode group is accommodated in a sealed outer casing as well as to the sealed-type rechargeable battery.

BACKGROUND ART

In recent years, a sealed-type rechargeable battery (which may be hereinafter simply referred to as "rechargeable battery") represented by a lithium ion rechargeable battery is used as a power source not only for a mobile apparatus such as a portable phone or a notebook personal computer but also for an electrically driven vehicle such as an electric automobile or a hybrid car. A cell constituting the rechargeable battery has a structure in which an electrode group is accommodated in an inside of a sealed outer casing, and the electrode group is constructed by winding or stacking a positive electrode and a negative electrode with a separator interposed therebetween. For example, a laminate film such as an aluminum laminate foil is used as the outer casing.

For use that requires a high voltage such as in a power source for electrically driven vehicles, the rechargeable battery is used in a mode of a battery module including a plurality of cells. In the battery module, the plurality of cells constitute an assembled battery in which the cells are connected, for example, two in parallel by two in series, and are accommodated in a case. Generally, the battery module mounted in vehicles is used in a mode of a battery pack. In the battery pack, a plurality of battery modules is connected in series and is accommodated in a case together with various apparatuses such as a controller. The case of the battery pack is formed to have a shape suitable for mounting in a vehicle, for example, a shape that conforms to the underfloor shape of the vehicle.

the rechargeable battery has a problem that, when the electrolytic solution is decomposed due to overcharging or the like, the cell swells to be deformed in accordance with rise in the internal pressure caused by the decomposition gas and, unless the charging current or the discharging current is stopped, this results in rupture of the rechargeable battery. Therefore, in order to prevent troubles, it is important to detect deformation of the rechargeable battery with a high degree of sensitivity so that the charging current or the discharging current can be stopped at appropriate times. Furthermore, in the rechargeable battery during the charging or discharging, the electrode group expands or contracts by change in volume of the active substance, so that a technique capable of detection at a high precision by distinguishing between the swelling accompanying such charging or discharging and the swelling accompanying the gas generation is desired.

Patent Document 1 discloses a method in which, by using a strain gauge provided on a wall surface of a battery case, the swelling of the battery case is detected. However, the sensitivity region of such a strain gauge is comparatively narrow. Also, to the swelling accompanying the gas generation (which may hereafter be referred to as "gas swelling") that increases with time, the swelling accompanying the charging or discharging (which may hereafter be referred to as "electrode swelling"), which is a smaller deformation than the gas swelling, is added. Therefore, it seems impossible to detect with a high precision by distinguishing between these swellings with the strain gauge.

Patent Document 2 discloses an apparatus in which, with respect to two or more thin-type batteries included in an assembled battery, a magnetic force generated by an electric current that flows through a bus bar in which the respective terminals thereof having the same polarity are connected is detected, and an abnormality is detected based on the detected magnetic force. However, in this method, the swelling of the thin-type batteries is not directly detected, thereby raising a fear that the sensitivity may be insufficient in detecting deformation of the rechargeable battery caused by swelling of the cells.

Patent Document 3 discloses a system in which, with respect to a side surface of a cell case that faces in a stacking direction of a stacked body of electrodes and a side surface of the cell case that faces in a direction perpendicular to the stacking direction, inter-axial distances between these two side surfaces and a wall surface of an accommodating case or the like are respectively detected, and an internal-pressure abnormality of the cells is detected based on the both detection results. However, in order to detect these inter-axial distances, a plurality of piezoelectric elements must be provided for one cell case, thereby unavoidably making the structure complex.

PRIOR ART DOCUMENTS

Patent Documents

Patent Document 1: JP-A-2003-59484
Patent Document 2: JP-A-2005-63736
Patent Document 3: JP-A-2011-198511

SUMMARY OF THE INVENTION

Problems to be Solved by the Invention

The present invention has been made in view of the aforementioned circumstances, and an object thereof is to provide a deformation detection method for a sealed-type rechargeable battery capable of detection at a high precision by distinguishing between the electrode swelling and the gas swelling with respect to deformation of the sealed-type rechargeable battery, as well as a sealed-type rechargeable battery.

Means for Solving the Problems

The present invention provides a deformation detection method for a sealed-type rechargeable battery in which an electrode group, which is formed by stacking or winding a positive electrode and a negative electrode with a separator interposed between the positive electrode and the negative electrode, is accommodated in a sealed outer casing, wherein a polymer matrix layer is attached to an outer surface of a wall portion of the outer casing that faces the electrode group in a thickness direction of the positive electrode and the negative electrode or in a direction perpendicular to the thickness direction, or a polymer matrix layer is attached to an outer surface of the electrode group in a thickness direction of the positive electrode and the negative electrode, the polymer matrix layer contains a filler that is dispersed therein and that changes an external field in response to deformation of the polymer matrix layer, and change in the external field accompanying the deformation of the polymer matrix layer is detected by a detection unit.

According to this method, when deformation of the rechargeable battery occurs by swelling of a cell, the polymer matrix layer is deformed in response to this, and change in the external field accompanying the deformation is detected by the detection unit. Based on this, the deformation of the rechargeable battery is detected with a high degree of sensitivity. Also, when the wall portion of the outer casing on which the polymer matrix layer has been attached faces the electrode group in the thickness direction mentioned above, the deformation of the rechargeable battery is detected with a high degree of sensitivity, though the electrode swelling is reflected on the detection results. Therefore, the detection can be made with a high precision by distinguishing between the electrode swelling and the gas swelling. On the other hand, when the wall portion of the outer casing on which the polymer matrix layer has been attached faces in a direction perpendicular to the thickness direction mentioned above, the gas swelling as distinguished from the electrode swelling can be detected with a high precision because the electrode swelling is hardly reflected on the detection results. Further, when the polymer matrix layer is attached to the outer surface of the electrode group in the thickness direction mentioned above, mainly the electrode swelling is reflected on the detection results, so that the electrode swelling as distinguished from the gas swelling can be detected with a high precision.

It is preferable that the polymer matrix layer contains a magnetic filler as the filler, and the detection unit detects change in a magnetic field as the external field. This allows that change in the magnetic field accompanying the deformation of the polymer matrix layer can be wirelessly detected. Also, because a Hall element having a wide sensitivity region can be used as the detection unit, detection with a high degree of sensitivity can be made in a wider range.

It is preferable that the polymer matrix layer is attached to an outer surface of a wall portion of the outer casing that is near to an electrode terminal. In the peripheries of the wall portion of the outer casing near the electrode terminals such as this, a space is generated due to difference between the thickness of the battery and the thickness of the electrode terminals in assembling the battery. In the case of a battery that requires an IC chip or the like, the IC chip or the like is often placed in this space. For this reason, according to the above construction, there will be no need to ensure an extraneous space for placing the polymer matrix layer. As a result of this, the integration density of the cells can be enhanced, thereby contributing to improvement in the energy density.

It is preferable that change in the external field accompanying the deformation of the polymer matrix layer attached to each of a plurality of the outer casings or a plurality of the electrode groups is detected by using the detection units the number of which is smaller than the number of the polymer matrix layers. This allows that the number of components can be reduced with respect to the detection unit, thereby producing an advantageous effect of space saving or weight reduction.

Further, the present invention provides a sealed-type rechargeable battery in which an electrode group, which is formed by stacking or winding a positive electrode and a negative electrode with a separator interposed between the positive electrode and the negative electrode, is accommodated in a sealed outer casing, comprising a polymer matrix layer and a detection unit, wherein the polymer matrix layer is attached to an outer surface of a wall portion of the outer casing that faces the electrode group in a thickness direction of the positive electrode and the negative electrode or in a direction perpendicular to the thickness direction, or is attached to an outer surface of the electrode group in a thickness direction of the positive electrode and the negative electrode, the polymer matrix layer contains a filler that is dispersed therein and that changes an external field in response to deformation of the polymer matrix layer, and the detection unit detects change in the external field accompanying the deformation of the polymer matrix layer.

According to this rechargeable battery, when deformation of the rechargeable battery occurs by swelling of a cell, the polymer matrix layer is deformed in response to this, and change in the external field accompanying the deformation is detected by the detection unit. Thereby, the deformation of the rechargeable battery is detected with a high degree of sensitivity. Also, when the wall portion of the outer casing on which the polymer matrix layer has been attached faces the electrode group in the thickness direction mentioned above, the deformation of the rechargeable battery is detected with a high degree of sensitivity, though the electrode swelling is reflected on the detection results. Therefore, the detection can be made with a high precision by distinguishing between the electrode swelling and the gas swelling. On the other hand, when the wall portion of the outer casing on which the polymer matrix layer has been attached faces in a direction perpendicular to the thickness direction mentioned above, the gas swelling as distinguished from the electrode swelling can be detected with a high precision because the electrode swelling is hardly reflected on the detection results. Further, when the polymer matrix layer is attached to the outer surface of the electrode group in the thickness direction mentioned above, mainly the electrode swelling is reflected on the detection results, so that the electrode swelling as distinguished from the gas swelling can be detected with a high precision.

BRIEF DESCRIPTION OF THE DRAWINGS

FIG. 1(a) is a perspective view, and FIG. 1(b) is a sectional view along A-A.

FIG. 2(a) is a perspective view, and FIG. 2(b) is a sectional view along B-B.

FIG. 3(a) is a perspective view, and FIG. 3(b) is a sectional view along C-C.

FIG. 5(a) is a perspective view, and FIG. 5(b) is a sectional view along D-D.

FIG. 7(a) is a perspective view, and FIG. 7(b) is a sectional view along E-E.

FIG. 9(a) is a perspective view, and FIG. 9(b) is a sectional view along F-F.

FIGS. 10(a) and 9(b) are schematic views illustrating a sealed-type rechargeable battery according to a seventh embodiment of the present invention, where FIG. 10(a) is a perspective view.

FIG. 11(a) is a perspective view, and FIG. 11(b) is a sectional view along H-H.

MODE FOR CARRYING OUT THE INVENTION

Embodiments of the present invention will be explained.

First Embodiment

Figure 1A:
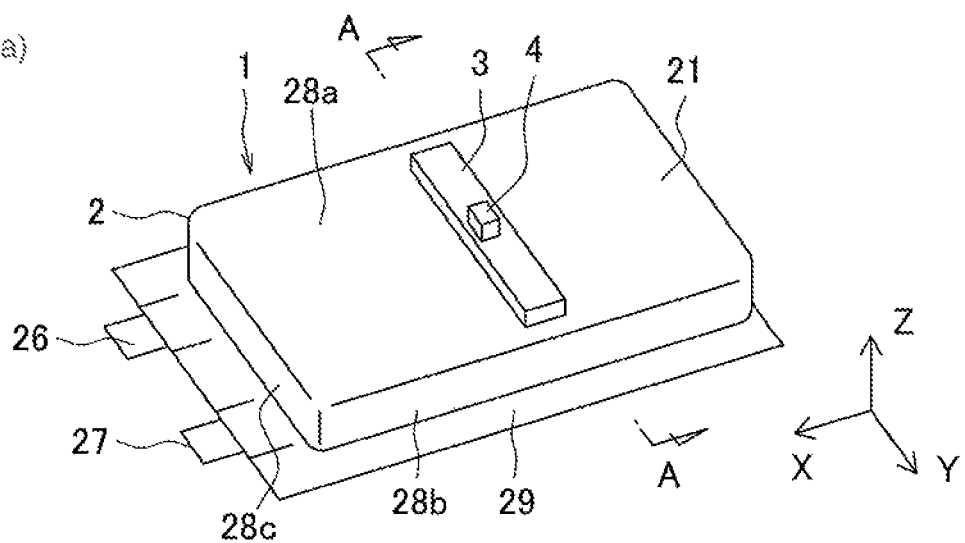
FIGS. 1(a) and 1(b) are schematic views illustrating a sealed-type rechargeable battery according to a first embodiment of the present invention, where

The sealed-type rechargeable battery 1 shown in FIG. 1 is provided with a polymer matrix layer 3 and a detection unit 4. A cell 2 constituting this rechargeable battery 1 has a structure in which an electrode group 22 is accommodated in a sealed outer casing 21. The electrode group 22 in the present embodiment is formed by stacking a positive electrode 23 and a negative electrode 24 with a separator 25 interposed therebetween, and such a stacked body is enclosed in the outer casing 21 together with an electrolytic solution. Leading wires are respectively connected to the positive electrode 23 and the negative electrode 24, and terminal ends of these leading wires protrude to the outside of the outer casing 21, so as to construct electrode terminals 26 and 27. The electrode terminals 26 and 27 are provided at one end in the X-direction of the outer casing 21.

The rechargeable battery 1 of the present embodiment is a laminate battery using a laminate film such as an aluminum laminate foil as the outer casing 21, and is specifically a laminate-type lithium ion rechargeable battery having a capacity of 1.44 Ah. The outer casing 21 has a plurality of wall portions including wall portions 28a to 28c and a welded portion 29 formed on three sides in the surroundings, and is formed to have a thin-type rectangular parallelepiped shape as a whole. The X-, Y-, and Z-directions correspond to the length direction, the width direction, and the thickness direction, respectively, of the cell 2. Also, the Z-direction is the thickness direction of the positive electrode 23 and the negative electrode 24, and the X-direction and the Y-direction are directions perpendicular to the thickness direction.

Figure 1B:
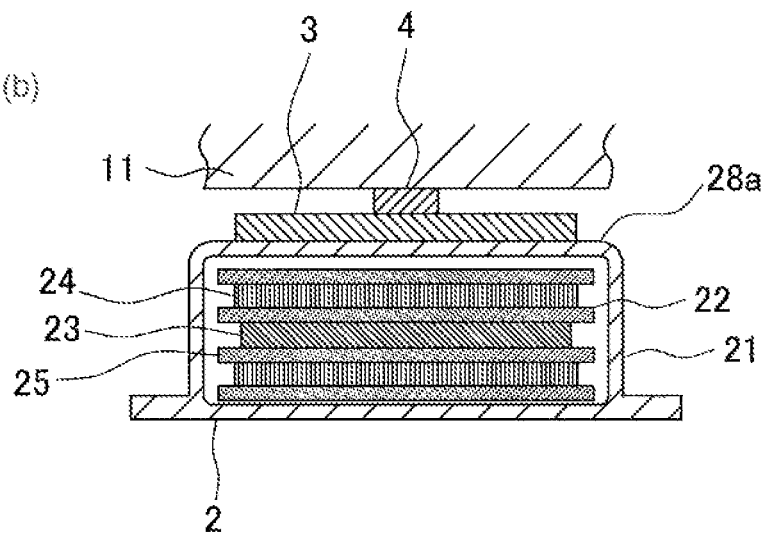

In the present embodiment, the polymer matrix layer 3 is attached to an outer surface of the wall portion 28a of the outer casing 21 that faces the electrode group 22 in the thickness direction of the positive electrode 23 and the negative electrode 24, that is, in the Z-direction (up-and-down direction in FIG. 1b). The outer surface of the wall portion 28a corresponds to an upper surface of the outer casing 21. The polymer matrix layer 3 faces the electrode group 22 with the wall portion 28a interposed therebetween, and is disposed parallel to an upper surface of the electrode group 22. Because the swelling of the cell 2 is larger at the central part of the wall portion 28a (central part in the length direction and in the width direction), the polymer matrix layer 3 is preferably attached so as to pass through the central part such as this. Although the polymer matrix layer 3 extends in the width direction, the present invention is not limited thereto.

The polymer matrix layer 3 contains a filler that is dispersed therein and that changes an external field in response to deformation of the polymer matrix layer 3. Further, a detection unit 4 detects the change in the external field accompanying the deformation of the polymer matrix layer 3. The polymer matrix layer 3 of the present embodiment is in a sheet form and is formed of an elastomer material that is capable of flexible deformation in response to swelling of the cell 2. When deformation of the rechargeable battery 1 occurs by swelling of the cell 2, the polymer matrix layer 3 is deformed in response to this, and the change in the external field accompanying the deformation of the polymer matrix layer 3 is detected by the detection unit 4. The deformation of the rechargeable battery 1 can be detected with a high degree of sensitivity based on this.

A detection signal that is output from the detection unit 4 is forwarded to a controlling apparatus not illustrated in the drawings. When change in the external field larger than or equal to a set value is detected by the detection unit 4, a switching circuit that is not illustrated in the drawings and that is connected to the controlling apparatus shuts off the energization and stops the charging current or the discharging current. In this manner, deformation of the rechargeable battery resulting from swelling of the cell 2 is detected with a high degree of sensitivity, and rupture of the rechargeable battery is prevented. In the present embodiment, detection can be made with a high precision by distinguishing between the electrode swelling and the gas swelling, so that the deformation of the rechargeable battery caused by the gas swelling can be detected with a high degree of sensitivity, and the troubles can be accurately prevented.

The gas swelling of the cell 2 is caused by rise in the internal pressure of the outer casing 21 accompanying the decomposed gas of the electrolytic solution, so that the gas swelling tends to act evenly in each of the X-, Y-, and Z-directions. In contrast, the electrode swelling is caused by change in the thickness of the electrode group 22 accompanying the change in volume of the active substance, so that the electrode swelling acts largely in the thickness direction of the positive electrode 23 and the negative electrode 24, that is, in the Z-direction. Therefore, in the present embodiment in which the polymer matrix layer 3 is attached to the wall portion 28a, the electrode swelling is reflected on the detection results. However, because the deformation of the rechargeable battery 1 is detected with a high degree of sensitivity, detection with a high precision can be made by distinguishing between the electrode swelling and the gas swelling, as shown in the Examples described later.

Only one cell 2 is shown in FIG. 1; however, a rechargeable battery 1 for use that requires a high voltage such as in a power source for the electrically driven vehicles is used in a mode of a battery module including a plurality of cells 2. In the battery module, the plurality of cells 2 constitutes an assembled battery and is accommodated in a case. Generally, the battery module mounted in vehicles is used in a mode of a battery pack. In the battery pack, a plurality of battery modules is connected in series and is accommodated in a case together with various apparatuses such as a controller. The case of the battery pack is formed to have a shape suitable for mounting in a vehicle, for example, a shape that conforms to the underfloor shape of the vehicle.

The detection unit 4 is disposed at a site where the change in the external field can be detected, and is preferably attached to a comparatively firm site that is hardly affected by the swelling of the cell 2. In the present embodiment, the detection unit 4 is attached to an inner surface of a case 11 of the battery module that faces the wall portion 28a. The case 11 of a battery module is formed, for example, of a metal or a plastic, and there may be cases in which a laminate film is used as the case 11 of the battery module. In the drawings, the detection unit 4 is disposed close to the polymer matrix layer 3; however, the detection unit 4 may be disposed to be distant from the polymer matrix layer 3.

In the present embodiment, the polymer matrix layer 3 contains a magnetic filler as the above-described filler, and the detection unit 4 detects change in a magnetic field as the above-described external field. In this case, the polymer matrix layer 3 is preferably a magnetic elastomer layer in which the magnetic filler is dispersed in a matrix that contains an elastomer component.

The magnetic filler may be, for example, a rare-earth-based, iron-based, cobalt-based, nickel-based, or oxide-based filler; however, a rare-earth-based filler is preferable because a higher magnetic force can be obtained. The shape of the magnetic filler is not particularly limited, so that the shape may be any one of spherical, flattened, needle-like, prismatic, and amorphous shapes. The average particle size of the magnetic filler is preferably from 0.02 to 500 μm, more preferably from 0.1 to 400 μm, and still more preferably from 0.5 to 300 μm. When the average particle size is smaller than 0.02 μm, the magnetic characteristics of the magnetic filler tend to deteriorate. On the other hand, when the average particle size exceeds 500 μm, the mechanical properties of the magnetic elastomer layer tend to deteriorate, and the magnetic elastomer layer tends to be brittle.

The magnetic filler may be introduced into the elastomer after magnetization; however, it is preferable to magnetize the magnetic filler after introduction into the elastomer. By magnetization after introduction into the elastomer, the polarity of the magnet can be easily controlled, and the magnetic field can be easily detected.

A thermoplastic elastomer, a thermosetting elastomer, or a mixture of these can be used as the elastomer component. Examples of the thermoplastic elastomer include a styrene-based thermoplastic elastomer, a polyolefin-based thermoplastic elastomer, a polyurethane-based thermoplastic elastomer, a polyester-based thermoplastic elastomer, a polyamide-based thermoplastic elastomer, a polybutadiene-based thermoplastic elastomer, a polyisoprene-based thermoplastic elastomer, and a fluororubber-based thermoplastic elastomer. Also, examples of the thermosetting elastomer include diene-based synthetic rubbers such as polyisoprene rubber, polybutadiene rubber, styrene-butadiene rubber, polychloroprene rubber, nitrile rubber, and ethylene-propylene rubber, non-diene-based synthetic rubbers such as ethylene-propylene rubber, butyl rubber, acrylic rubber, polyurethane rubber, fluororubber, silicone rubber, and epichlorohydrin rubber, and natural rubbers. Among these, a thermosetting elastomer is preferable, and this is because settling of the magnetic elastomer accompanying the heat generation or overloading of the battery can be suppressed. Further, a polyurethane rubber (which may also be referred to as a polyurethane elastomer) or a silicone rubber (which may also be referred to as a silicone elastomer) is more preferable.

A polyurethane elastomer can be obtained by reacting a polyol with a polyisocyanate. In the case in which the polyurethane elastomer is used as the elastomer component, a magnetic filler is mixed with a compound containing active hydrogen, and further an isocyanate component is added thereto to obtain a mixture liquid. Also, a mixture liquid can also be obtained by mixing a magnetic filler with an isocyanate component, and mixing a compound containing active hydrogen thereto. The magnetic elastomer can be produced by injecting the mixture liquid into a mold that has been subjected to a releasing treatment, and thereafter heating the mixture liquid up to a curing temperature for curing. Also, in the case in which a silicone elastomer is used as the elastomer component, the magnetic elastomer can be produced by putting a magnetic filler into a precursor of a silicone elastomer, mixing the components, putting the resulting mixture into a mold, and thereafter heating the mixture for curing. A solvent may be added as necessary.

A compound known in the art in the field of polyurethane can be used as the isocyanate component that can be used in the polyurethane elastomer. Examples of the isocyanate component include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate, aliphatic diisocyanates such as ethylene diisocyanate, 2,2,4-trimethylhexamethylene diisocyanate, and 1,6-hexamethylene diisocyanate, and alicyclic diisocyanates such as 1,4-cyclohexane diisocyanate, 4,4'-dicyclohexylmethane diisocyanate, isophorone diisocyanate, and norbornane diisocyanate. These may be used either alone or as a mixture of two or more kinds. Also, the isocyanate component may be a modified component such as a urethane-modified, allophanate-modified, biuret-modified, or isocyanurate-modified component. Preferable isocyanate components are 2,4-toluene diisocyanate, 2,6-toluene diisocyanate, and 4,4'-diphenylmethane diisocyanate. 2,4-toluene diisocyanate or 2,6-toluene diisocyanate is more preferable.

A compound typically used in the technical field of polyurethane can be used as the compound containing active hydrogen. Examples of the compound containing active hydrogen include high-molecular-weight polyols such as polyether polyols represented by polytetramethylene glycol, polypropylene glycol, polyethylene glycol, and a copolymer of propylene oxide and ethylene oxide, polyester polyols represented by polybutylene adipate, polyethylene adipate, and 3-methyl-1,5-pentane adipate, polyester polycarbonate polyols typified by reaction products of alkylene carbonate and polyester glycol such as polycaprolactone polyol or polycaprolactone, polyester polycarbonate polyols obtained by reacting ethylene carbonate with a polyhydric alcohol and subsequently reacting the obtained reaction mixture with an organic dicarboxylic acid, and polycarbonate polyols obtained by transesterification reaction of a polyhydroxyl compound and aryl carbonate. These may be used either alone or as a mixture of two or more kinds.

In addition to the above-described high-molecular-weight polyol components, low-molecular-weight polyol components such as ethylene glycol, 1,2-propylene glycol, 1,3-propylene glycol, 1,4-butanediol, 1,6-hexanediol, neopentyl glycol, 1,4-cyclohexanedimethanol, 3-methyl-1,5-pentanediol, diethylene glycol, triethylene glycol, 1,4-bis(2- hydroxyethoxy)benzene, trimethylolpropane, glycerin, 1,2,6-hexanetriol, pentaerythritol, tetramethylolcyclohexane, methylglucoside, sorbitol, mannitol, dulcitol, sucrose, 2,2,6,6-tetrakis(hydroxymethyl)cyclohexanol, and triethanolamine, and low-molecular-weight polyamine components such as ethylenediamine, tolylenediamine, diphenylmethanediamine, and diethylenetriamine may be used as the compound containing active hydrogen. These may be used either alone or as a mixture of two or more kinds. Further, polyamines typified by 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethyleneglycol-di-p-aminobenzoate, polytetramethyleneoxide-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 4,4'-diamino-3,3'-diethyldiphenylmethane, 4,4'-diamino-3,3'-diethyl-5,5'-dimethyldiphenylmethane, 4,4'-diamino-3,3'-diisopropyl-5,5'-dimethyldiphenylmethane, 4,4'-diamino-3,3',5,5'-tetraethyldiphenylmethane, 4,4'-diamino-3,3',5,5'-tetraisopropyldiphenylmethane, m-xylylenediamine, N,N'-di-sec-butyl-p-phenylenediamine, m-phenylenediamine, and p-xylylenediamine may also be mixed. Preferable compounds containing active hydrogen are polytetramethylene glycol, polypropylene glycol, a copolymer of propylene oxide and ethylene oxide, and 3-methyl-1,5-pentane adipate. More preferable compounds containing active hydrogen are polypropylene glycol and a copolymer of propylene oxide and ethylene oxide.

A preferable combination of the isocyanate component and the compound containing active hydrogen is a combination of one kind or two more kinds of 2,4-toluene diisocyanate, 2,6-toluene diisocyanate, and 4,4'-diphenylmethane diisocyanate as the isocyanate component and one kind or two more kinds of polytetramethylene glycol, polypropylene glycol, a copolymer of propylene oxide and ethylene oxide, and 3-methyl-1,5-pentane adipate as the compound containing active hydrogen. A more preferable combination is a combination of 2,4-toluene diisocyanate and/or 2,6-toluene diisocyanate as the isocyanate component and polypropylene glycol and/or a copolymer of propylene oxide and ethylene oxide as the compound containing active hydrogen.

The polymer matrix layer 3 may be a foamed body containing a dispersed filler and bubbles. A general resin foam can be used as the foamed body. However, in view of the characteristics such as compression set, it is preferable to use a thermosetting resin foam. Examples of the thermosetting resin foam include polyurethane resin foam and silicone resin foam. Among these, polyurethane resin foam is preferable. The isocyanate component and the compound containing active hydrogen that have been listed above can be used for the polyurethane resin foam.

The amount of the magnetic filler in the magnetic elastomer is preferably 1 to 450 parts by weight, more preferably 2 to 400 parts by weight, relative to 100 parts by weight of the elastomer component. When the amount is smaller than 1 part by weight, detection of change in the magnetic field tends to be difficult. When the amount exceeds 450 parts by weight, the magnetic elastomer itself may in some cases become brittle.

For the purpose of preventing rusts of the magnetic filler or the like, a sealing material for sealing the polymer matrix layer 3 may be provided to such a degree that the flexibility of the polymer matrix layer 3 is not deteriorated. A thermoplastic resin, a thermosetting resin, or a mixture of these may be used as the sealing material. The thermoplastic resin may be, for example, styrene-based thermoplastic elastomer, polyolefin-based thermoplastic elastomer, polyurethane-based thermoplastic elastomer, polyester-based thermoplastic elastomer, polyamide-based thermoplastic elastomer, polybutadiene-based thermoplastic elastomer, polyisoprene-based thermoplastic elastomer, fluorine-based thermoplastic elastomer, ethylene•ethyl acrylate copolymer, ethylene-vinyl acetate copolymer, polyvinyl chloride, polyvinylidene chloride, chlorinated polyethylene, fluororesin, polyamide, polyethylene, polypropylene, polyethylene terephthalate, polybutylene terephthalate, polystyrene, polybutadiene, or the like. The thermosetting resin may be, for example, diene-based synthetic rubbers such as polyisoprene rubber, polybutadiene rubber, styrene-butadiene rubber, polychloroprene rubber, and acrylonitrile-butadiene rubber, non-diene-based rubbers such as ethylene-propylene rubber, ethylene-propylene-diene rubber, butyl rubber, acrylic rubber, polyurethane rubber, fluorine-containing rubber, silicone rubber, and epichlorohydrin rubber, natural rubbers, and thermosetting resins such as polyurethane resin, silicone resin, epoxy resin, or the like. These films may be stacked or may be a film including a metal foil such as aluminum foil or a metal vapor-deposition film including a metal vapor-deposited on the above-described film.

The polymer matrix layer 3 may be one in which the filler is unevenly distributed in the thickness direction thereof. For example, the polymer matrix layer 3 may be made of two layers, that is, a region on a one side containing a relatively larger amount of the filler and a region on the other side containing a relatively smaller amount of the filler. In the region that is located on the one side and that contains a larger amount of the filler, a large change in the external field results from small deformation of the polymer matrix layer 3, so that the sensor sensitivity to a low internal pressure can be enhanced. Also, a region that is located on the other side and that contains a relatively smaller amount of the filler is comparatively flexible and can be easily moved. Therefore, by attaching this region located on the other side, the polymer matrix layer 3 (particularly the region located on the one side) becomes capable of being easily deformed.

The filler uneven distribution ratio in the region on the one side preferably exceeds 50, and is more preferably 60 or more, still more preferably 70 or more. In this case, the filler uneven distribution ratio in the region on the other side is less than 50. The filler uneven distribution ratio in the region on the one side is 100 at the maximum, and the filler uneven distribution ratio in the region on the other side is 0 at the minimum. Therefore, it is possible to adopt a stacked body structure including an elastomer layer that contains a filler and an elastomer layer that does not contain the filler. For uneven distribution of the filler, it is possible to use a method in which, after the filler is introduced into the elastomer component, the resultant is left to stand still at room temperature or at a predetermined temperature, so as to attain natural settling of the filler by the weight of the filler. By changing the temperature or time for leaving the filler to stand still, the filler uneven distribution ratio can be adjusted. The filler may be distributed unevenly by using a physical force such as a centrifugal force or a magnetic force. Alternatively, the polymer matrix layer may be composed of a stacked body made of a plurality of layers having different contents of the filler.

The filler uneven distribution ratio is measured by the following method. That is, the cross-section of the polymer matrix layer is observed at a magnification of 100 times by using a scanning electron microscope-energy dispersive X-ray analyzer (SEM-EDS). The existence amount of the metal element inherent in the filler (for example, Fe element in the magnetic filler of the present embodiment) is determined by element analysis for the whole region in the thickness direction of the cross-section and for each of the two regions obtained by equally dividing the cross-section into two in the thickness direction. With respect to this existence amount, the ratio of the existence amount in the region on the one side relative to the existence amount in the whole region in the thickness direction is calculated, and this is determined as the filler uneven distribution ratio in the region on the one side. The filler uneven distribution ratio in the region on the other side can be determined in the same manner.

The region on the other side containing a relatively smaller amount of the filler may have a structure formed of a foamed body containing bubbles. This allows that the polymer matrix layer 3 can be more easily deformed, so that the sensor sensitivity is enhanced. Also, the region on the one side as well as the region on the other side may be formed of a foamed body. In this case, the whole of the polymer matrix layer 3 is made of a foamed body. The polymer matrix layer in which at least a part thereof in the thickness direction is made of a foamed body may be composed of a stacked body including a plurality of layers (for example, a non-foamed layer that contains a filler and a foamed layer that does not contain a filler).

As the detection unit 4 for detecting change in the magnetic field, a magnetic resistance element, a Hall element, an inductor, an MI element, a flux gate sensor, or the like can be used, for example. As the magnetic resistance element, a semiconductor compound magnetic resistance element, an anisotropic magnetic resistance element (AMR), a gigantic magnetic resistance element (GMR), and a tunnel magnetic resistance element (TMR) may be mentioned as examples. Among these, a Hall element is preferable, and this is because the Hall element has high sensitivity in a wide range, and is useful as the detection unit 4. As the Hall element, EQ-430L manufactured by Asahi Kasei Microdevices Corporation can be used, for example.

Second Embodiment

A second embodiment has a construction and a function similar to those of the first embodiment except for the matters described below, so that mainly the differing points will be described by omitting description of the common points. Here, constituent elements equal to the constituent elements already described will be denoted with equal reference signs, and duplicated description thereof will be omitted. The same applies to the third to eighth embodiments described later as well.

Figure 2A:
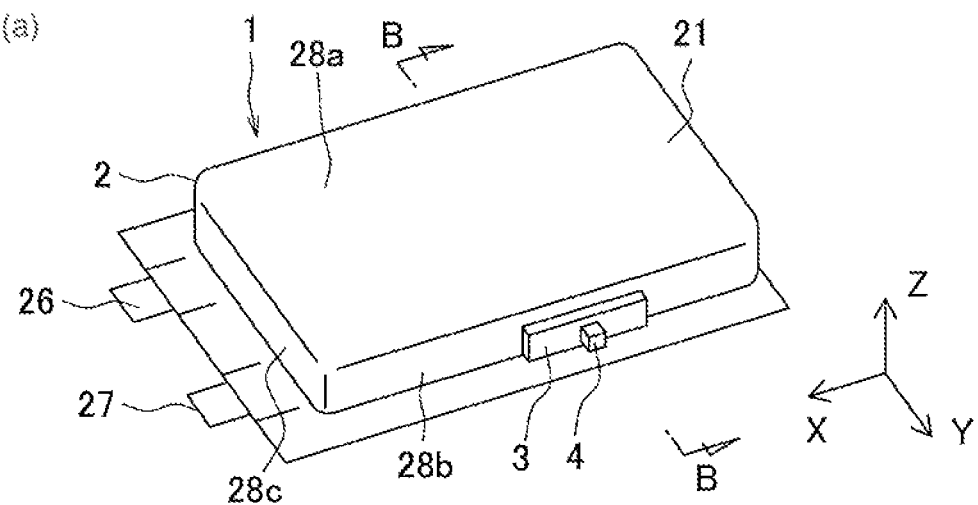
FIGS. 2(a) and 2(b) are schematic views illustrating a sealed-type rechargeable battery according to a second embodiment of the present invention, where
Figure 2B:
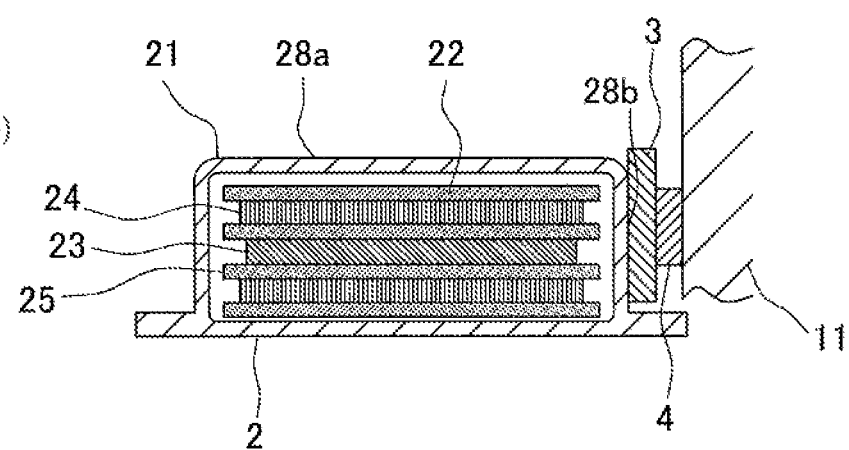

Referring to FIG. 2, in the present embodiment, a polymer matrix layer 3 is attached to an outer surface of a wall portion 28b of an outer casing 21 that faces an electrode group 22 in a direction perpendicular to the thickness direction of a positive electrode 23 and a negative electrode 24, specifically, in the Y-direction (right-and-left direction in FIG. 2b). The outer surface of the wall portion 28b corresponds to a side surface of the outer casing 21. The polymer matrix layer 3 faces the electrode group 22 with the wall portion 28b interposed therebetween, and is disposed perpendicularly to an upper surface of the electrode group 22. The detection unit 4 is attached to an inner surface of a case 11 of a battery module that faces the wall portion 28b. The electrode swelling exerts a larger action in the Z-direction. Therefore, in the present embodiment in which the polymer matrix layer 3 is attached to the wall portion 28b, the electrode swelling is hardly reflected on the detection results, so that the gas swelling as distinguished from the electrode swelling can be detected with a high precision.

Third Embodiment

Figure 3A:
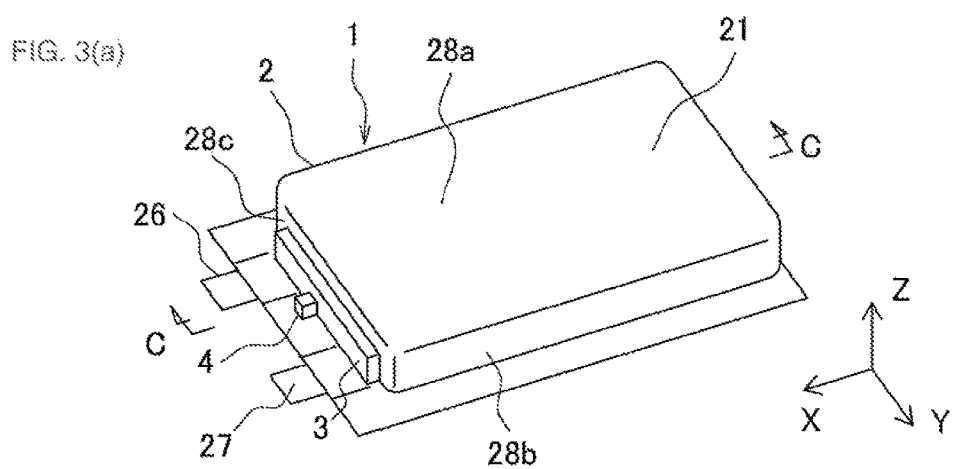
FIGS. 3(a) and 3(b) are schematic views illustrating a sealed-type rechargeable battery according to a third embodiment of the present invention, where
Figure 3B:
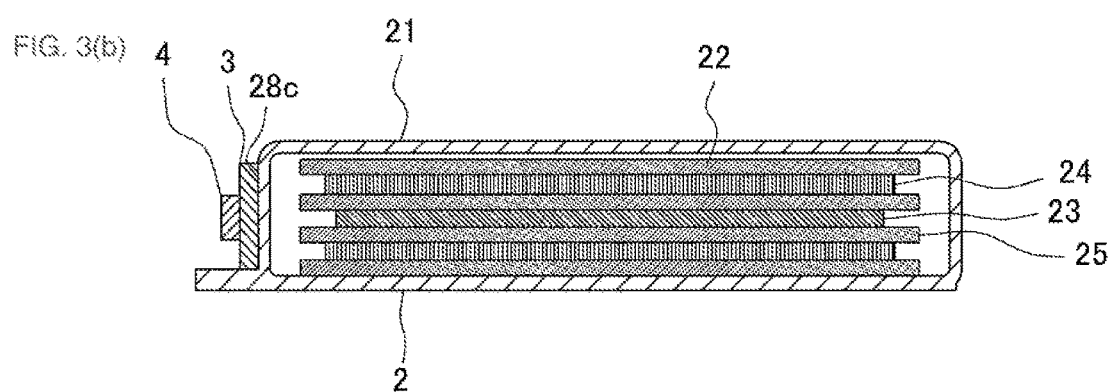

Referring to FIG. 3, in the present embodiment, a polymer matrix layer 3 is attached to an outer surface of a wall portion 28c of an outer casing 21 that faces an electrode group 22 in a direction perpendicular to the thickness direction of a positive electrode 23 and a negative electrode 24, specifically, in the X-direction (right-and-left direction in FIG. 3b). The outer surface of the wall portion 28c corresponds to a side surface of the outer casing 21. The polymer matrix layer 3 faces the electrode group 22 with the wall portion 28c interposed therebetween, and is disposed perpendicularly to an upper surface of the electrode group 22. The detection unit 4 is attached to an inner surface of a case (not shown) of a battery module that faces the wall portion 28c. The electrode swelling exerts a larger action in the Z-direction. Therefore, in the present embodiment in which the polymer matrix layer 3 is attached to the wall portion 28c, the electrode swelling is hardly reflected on the detection results, so that the gas swelling as distinguished from the electrode swelling can be detected with a high precision.

Also, because the polymer matrix layer 3 is attached to the outer surface of the wall portion 28c of the outer casing 21 near the electrode terminals 26 and 27 in this manner, there is no need to ensure an extraneous space for placing the polymer matrix layer 3. This is because, in the peripheries of the wall portion 28c near the electrode terminals 26 and 27, a space is generated due to difference between the thickness of the battery and the thickness of the electrode terminals. In the case of a battery that requires an IC chip or the like, the IC chip or the like is often placed in this space. As a result of this, the integration density of the cells 2 in the battery module can be enhanced, thereby contributing to improvement in the energy density.

Examples in the First to Third Embodiments

Figure 4:
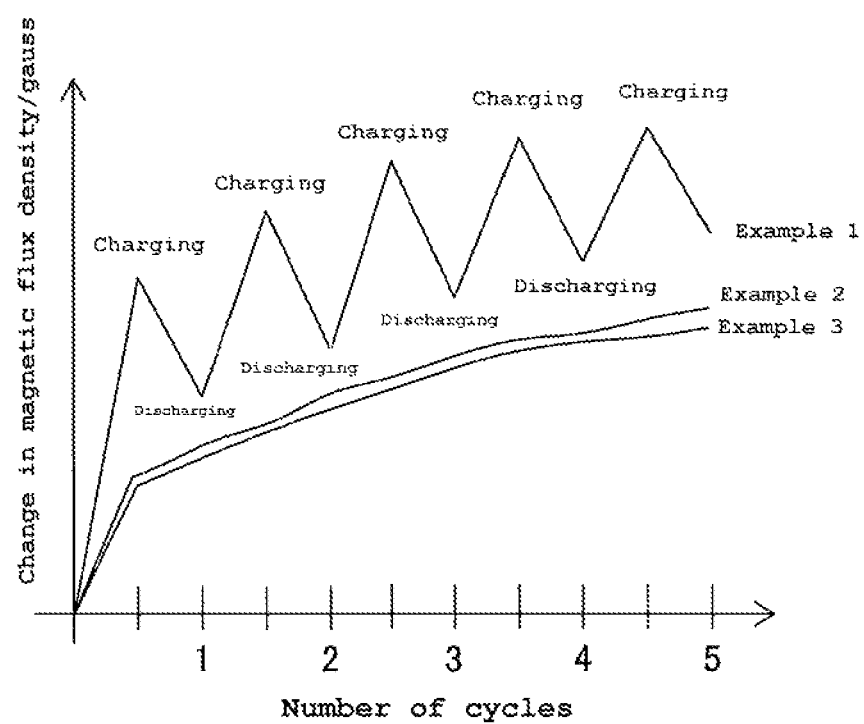
FIG. 4 is a graph showing a relationship between the number of cycles and change in the magnetic flux density in Examples 1 to 3.

The detection results to the swelling of a cell according to the first to third embodiments are shown in FIG. 4 as Examples 1 to 3, respectively. The cell was put into a thermostat of 25° C. After the cell was left to stand quietly for 120 minutes, the cell was charged up to 4.3 V at a constant current with a charging current of 1.44 A. After the voltage reached 4.3 V, the cell was charged at a constant voltage until the electric current value decayed to be 0.07 A. Thereafter, an open-circuit state was maintained for 10 minutes, and then the cell was discharged down to 3.0 V at a constant current with a current of 1.44 A. Such a charging and discharging step was repeated for five cycles, and change in the magnetic flux density (change in the magnetic field) was detected with a Hall element after charging and discharging of each cycle.

In Example 1, the magnetic flux density increases to a great extent in accordance with the charging, and the magnetic flux density decreases to a great extent in accordance with the discharging. This is because the expansion or contraction of the electrode group 22 caused by change in volume of the active substance is reflected. Therefore, it can be stated that the first embodiment is a mode suitable for monitoring the electrode swelling accompanying the charging and discharging. Also, in comparison at time points having the same charging depth of each cycle (for example, the fully charged state or the completely discharged state), the magnitude of the magnetic flux density increases gradually according as the number of cycles increases. Such a phenomenon is caused by gas swelling, so that the gas swelling also can be detected based on this.

On the other hand, in Examples 2 and 3, great change in the magnetic flux density accompanying the charging and discharging is not seen. This is because the electrode swelling is not reflected on the detection results. Therefore, the gas swelling as distinguished from the electrode swelling can be detected with a high precision. By this, it can be stated that the second and third embodiments are modes suitable for monitoring the gas swelling.

Also, in the case of a rechargeable battery in which improvement in the energy density is emphasized, there is a fear in the first and second embodiments that the placement of the polymer matrix layer 3 may become difficult, whereas in the third embodiment, the polymer matrix layer 3 is disposed at a site where a predetermined space is provided, thereby reducing such a fear. Nonetheless, the behavior of change in the magnetic flux density is approximately the same between Example 2 and Example 3. Therefore, it can be stated that the third embodiment is a mode suitable for monitoring the gas swelling in a rechargeable battery in which improvement in the energy density is emphasized.

Fourth Embodiment

Figure 5A:
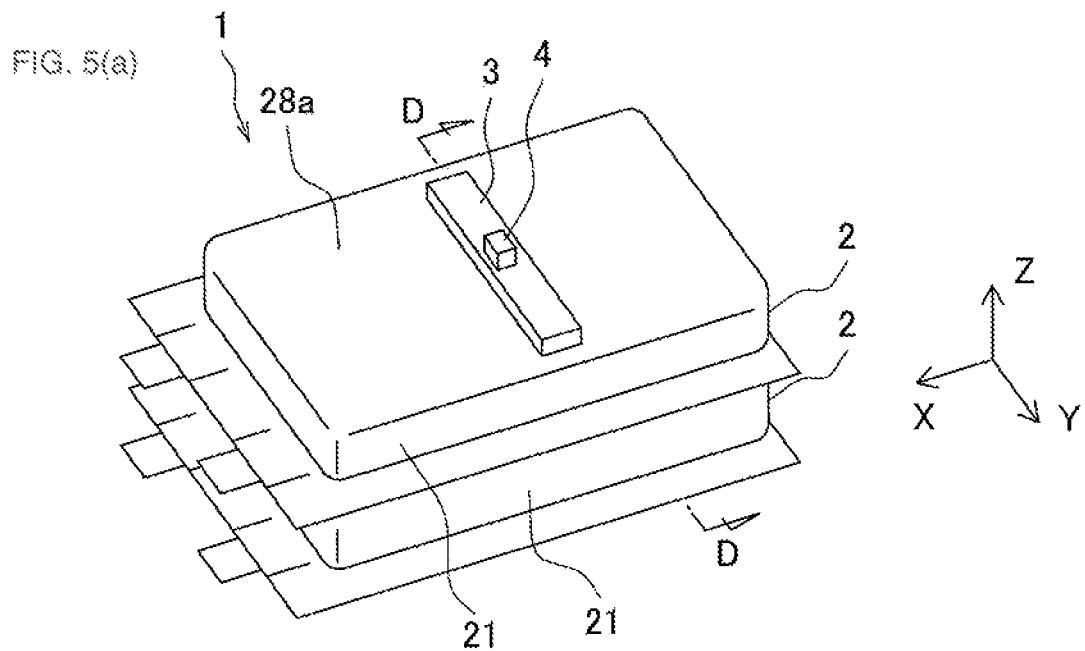
FIGS. 5(a) and 5(b) are schematic views illustrating a sealed-type rechargeable battery according to a fourth embodiment of the present invention, where
Figure 5B:
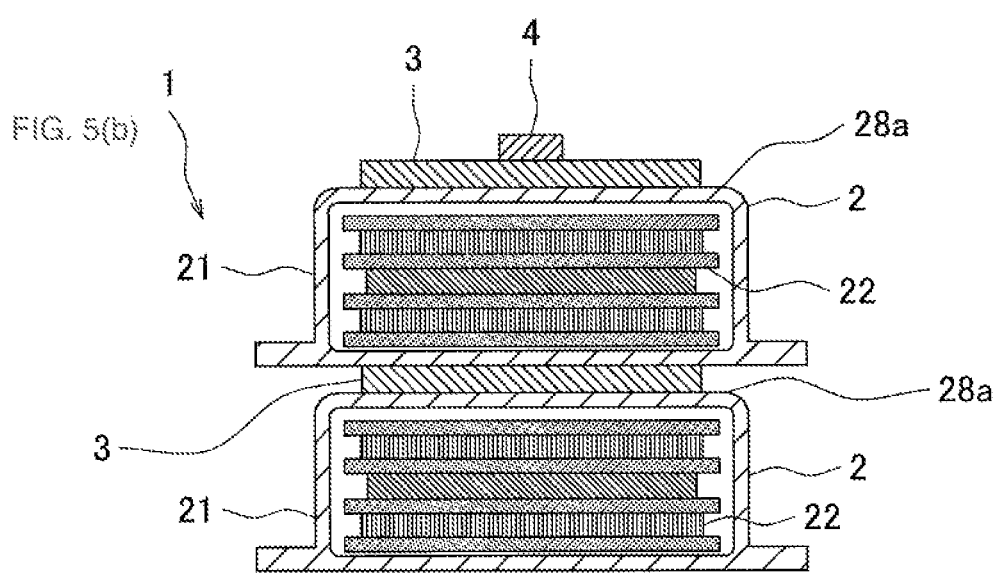

Referring to FIG. 5, in the present embodiment, change in the external field accompanying the deformation of a polymer matrix layer 3 attached to each of a plurality of outer casings 21 is detected by using detection units 4 the number of which is smaller than that of the polymer matrix layers 3. Specifically, two cells 2 in each of which the polymer matrix layer 3 is attached to the upper surface of the outer casing 21 are superposed and disposed in the Z-direction, and change in the external field accompanying the deformation of each of the polymer matrix layers 3 is detected with the detection unit 4 that is disposed above the cells 2. This reduces the number of detection units 4, and an advantageous effect of space saving or weight reduction is produced, thereby being useful in constructing the assembled battery.

Examples in the Fourth Embodiment

Figure 6:
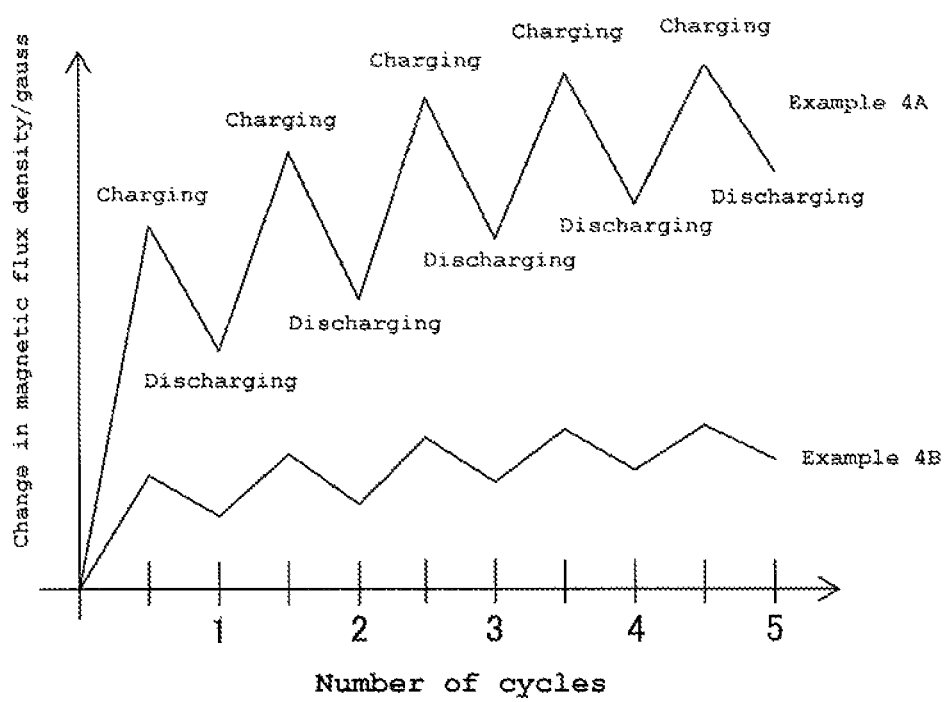
FIG. 6 is a graph showing a relationship between the number of cycles and change in the magnetic flux density in Examples 4A and 4B.

The detection results to the swelling of a cell according to the fourth embodiment are shown in FIG. 6 as Examples 4A and 4B, respectively. The procedure of detection was the same as that of Example 1 and the like. Example 4A corresponds to the swelling of the cell on the upper side which is close to a detection unit, and Example 4B corresponds to the swelling of the cell on the lower side which is distant from the detection unit. The behavior of change in the magnetic flux density of Example 4A is similar to that of Example 1, so that a detailed description thereof will be omitted. In Example 4B, change in the magnetic flux density has been detected to such a degree that a tendency similar to that of Example 4A can be recognized. Therefore, it can be stated that the fourth embodiment is a mode suitable for detecting the electrode swelling and the gas swelling of a plurality of cells with detection units (Hall elements) the number of which is smaller than that of the plurality of cells.

Fifth Embodiment

Figure 7A:
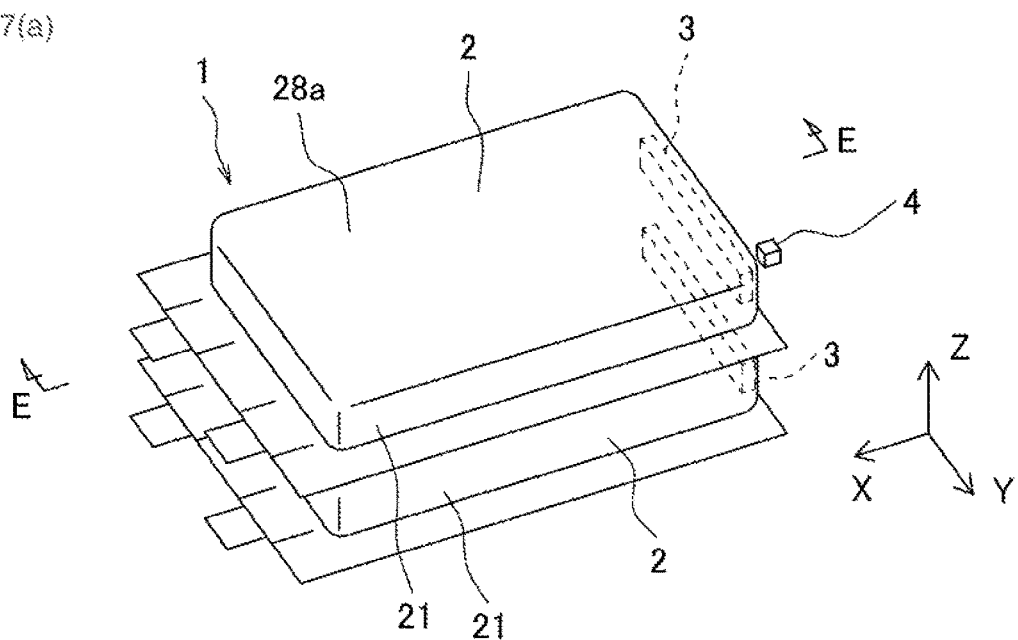
FIGS. 7(a) and 7(b) are schematic views illustrating a sealed-type rechargeable battery according to a fifth embodiment of the present invention, where
Figure 7B:
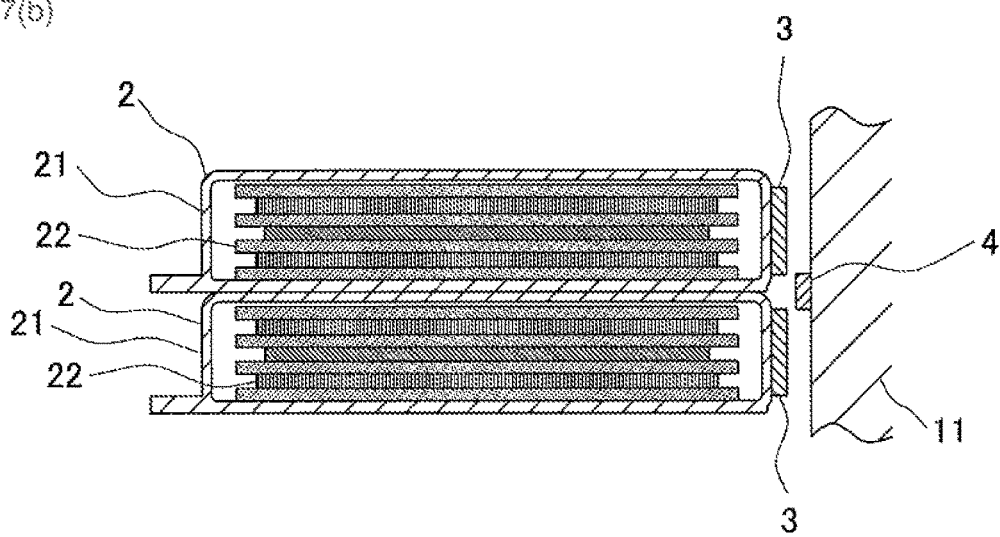

Referring to FIG. 7, in the present embodiment, change in the external field accompanying the deformation of a polymer matrix layer 3 attached to each of a plurality of outer casings 21 is detected by using detection units 4 the number of which is smaller than that of the polymer matrix layers 3. Specifically, two cells 2 in each of which the polymer matrix layer 3 is attached to the side surface of the outer casing 21 are superposed and disposed in the Z-direction, and change in the external field accompanying the deformation of each of the polymer matrix layers 3 is detected with the detection unit 4 that is disposed laterally to the cells 2. This reduces the number of detection units 4, and an advantageous effect of space saving or weight reduction is produced, thereby being useful in constructing the assembled battery.

Examples in the Fifth Embodiment

Figure 8:
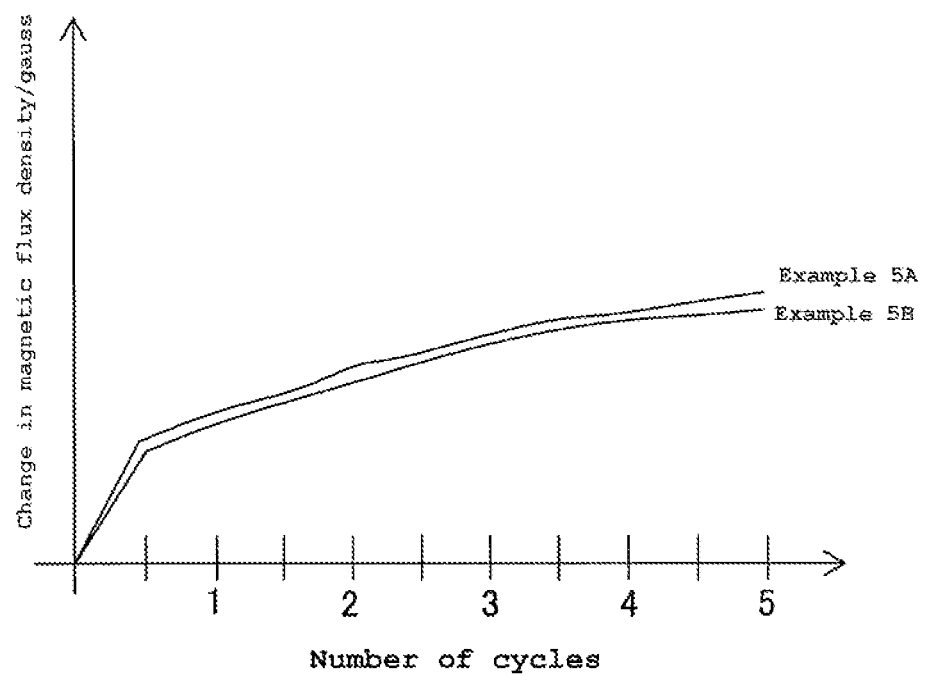
FIG. 8 is a graph showing a relationship between the number of cycles and change in the magnetic flux density in Examples 5A and 5B.

The detection results to the swelling of a cell according to the fifth embodiment are shown in FIG. 8 as Examples 5A and 5B, respectively. The procedure of detection was the same as that of Example 1 and the like. Examples 5A and 5B correspond to the swelling of the cell on the upper side and on the lower side, respectively. The behavior of change in the magnetic flux density of Examples 5A and 5B is similar to that of Example 2, so that a detailed description thereof will be omitted. In this manner, the same degree of change in the magnetic flux density has been detected with respect to the plurality of cells. Therefore, it can be stated that the fifth embodiment is a mode suitable for detecting the gas swelling of a plurality of cells with detection units (Hall elements) the number of which is smaller than that of the plurality of cells.

Sixth Embodiment

Figure 9A:
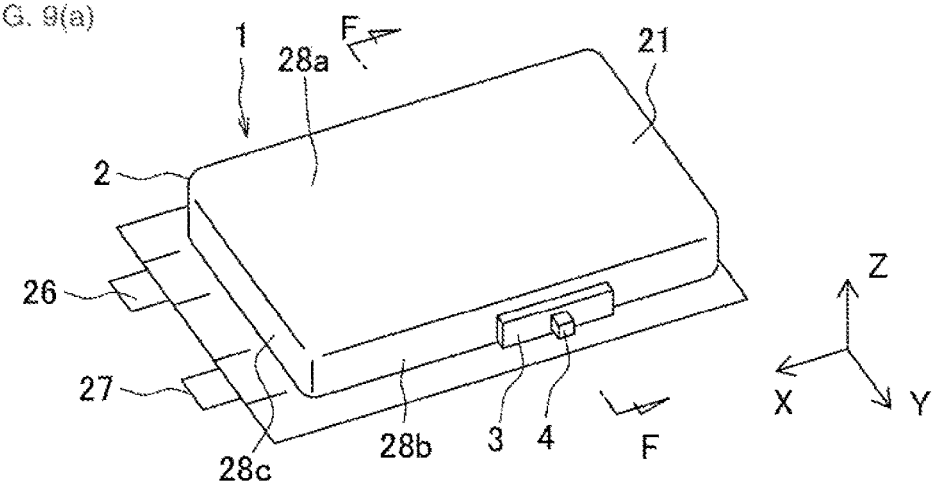
FIGS. 9(a) and 9(b) are schematic views illustrating a sealed-type rechargeable battery according to a sixth embodiment of the present invention, where
Figure 9B:
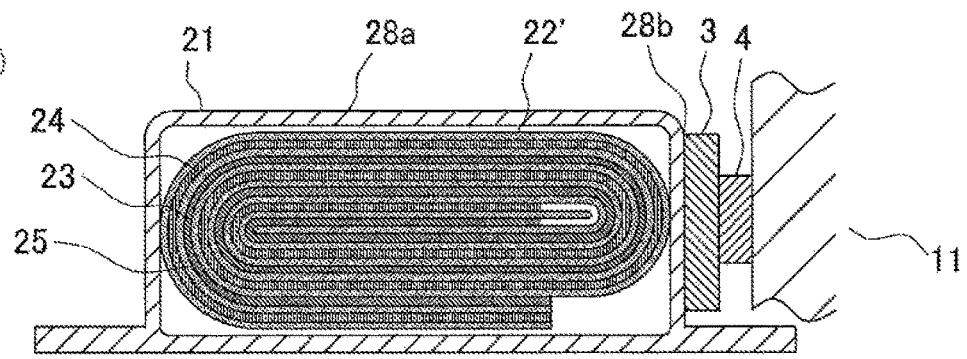

Referring to FIG. 9, in the present embodiment, an electrode group 22' is formed by winding a positive electrode 23 and a negative electrode 24 with a separator 25 interposed therebetween, and such a wound body is enclosed in an outer casing 21 together with an electrolytic solution. In such a winding structure, the Z-direction and the Y-direction correspond to the thickness direction of the positive electrode 23 and the negative electrode 24, and the X-direction corresponds to the direction perpendicular to the thickness direction.

Therefore, in the present embodiment, the polymer matrix layer 3 is attached to an outer surface of a wall portion 28b of the outer casing 21 that faces the electrode group 22' in the Y-direction (right-and-left direction in FIG. 9b) serving as the thickness direction of the positive electrode 23 and the negative electrode 24. The outer surface of the wall portion 28b corresponds to the side surface of the outer casing 21.

In such a construction, the electrode swelling acts largely both in the Z-direction and in the Y-direction, and the polymer matrix layer 3 is attached to the outer surface of the wall portion 28b that faces the electrode group 22' in the Y-direction, so that the electrode swelling is reflected on the detection results. Also, in the case in which the polymer matrix layer 3 is attached to an outer surface of a wall portion 28a in place of the wall portion 28b, the wall portion 28a faces the electrode group 22' in the Z-direction, so that the electrode swelling is likewise reflected on the detection results. In this manner, in the case in which the electrode group 22' has a winding structure, the electrode swelling can be detected with the polymer matrix layer 3 attached to the side surface of the outer casing 21.

Seventh Embodiment

Figure 10A:
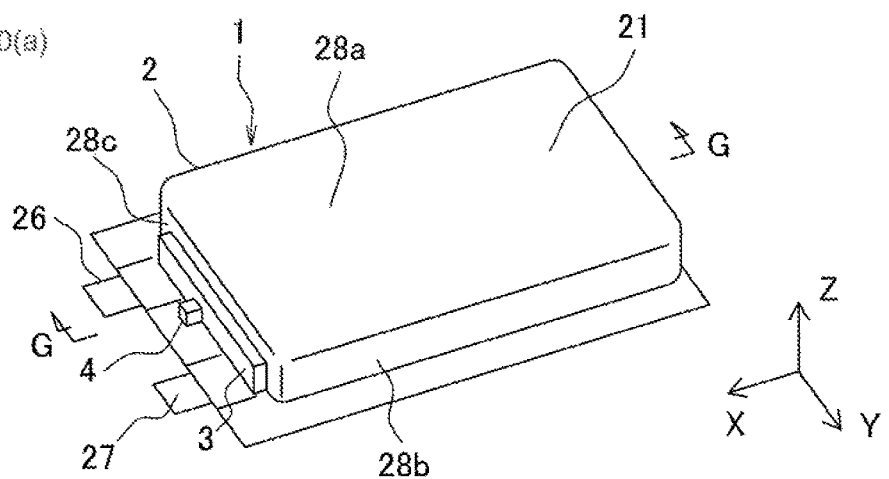
Figure 10B:
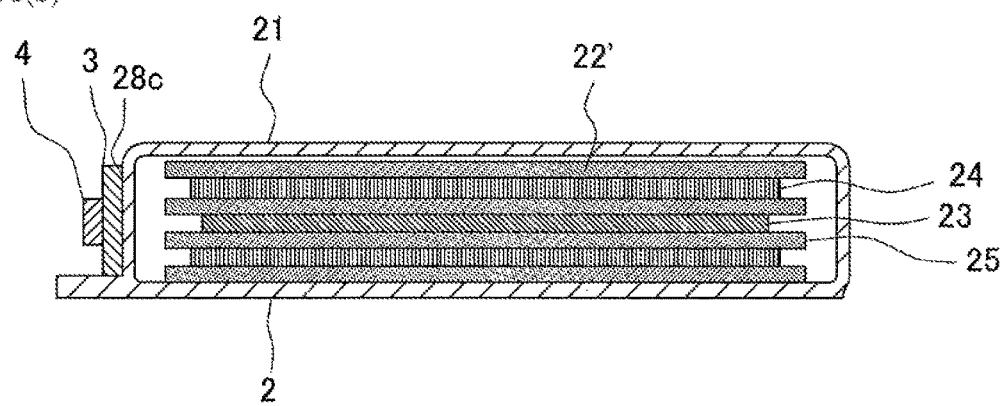
FIG. 10(b) is a sectional view along G-G.

Referring to FIG. 10, in the present embodiment, a polymer matrix layer 3 is attached to an outer surface of a wall portion 28c of a outer casing 21 that faces an electrode group 22' in a direction perpendicular to the thickness direction of a positive electrode 23 and a negative electrode 24, that is, in the X-direction (right-and-left direction in FIG. 10b). The electrode group 22' is formed by winding the positive electrode 23 and the negative electrode 24 with a separator 25 interposed therebetween. The polymer matrix layer 3 faces the electrode group 22' with the wall portion 28c interposed therebetween and is disposed perpendicularly to the upper surface of the electrode group 22'. In such a construction, the electrode swelling is hardly reflected on the detection results, so that the gas swelling as distinguished from the electrode swelling can be detected with a high precision, and also an improvement in the energy density can be achieved.

Eighth Embodiment

Figure 11A:
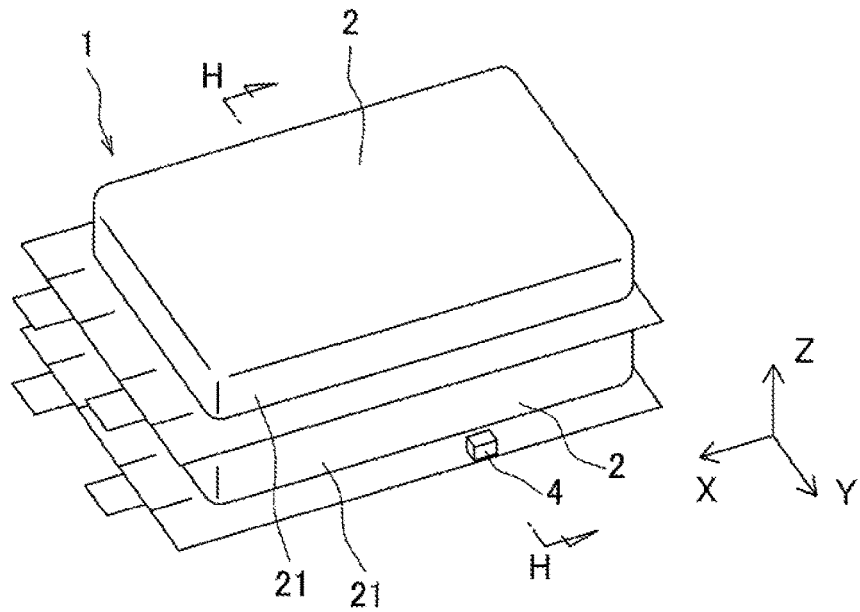
FIGS. 11(a) and 11(b) are schematic views illustrating a sealed-type rechargeable battery according to a eighth embodiment of the present invention, where
Figure 11B:
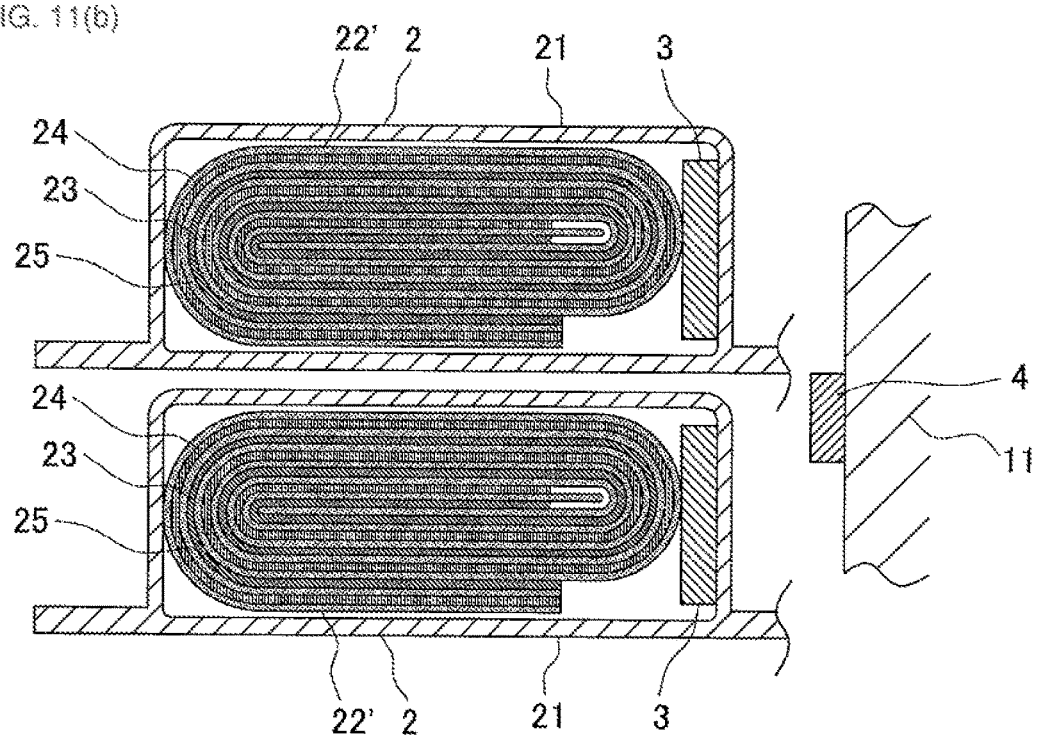

Referring to FIG. 11, in the present embodiment, a polymer matrix layer 3 is attached to the outer surface of an electrode group 22' in the Y-direction which is one of the Z-direction and the Y-direction serving as the thickness direction of a positive electrode 23 and a negative electrode 24, and the polymer matrix layer 3 is disposed in a cell 2. In such a construction, mainly the electrode swelling is reflected on the detection results, so that the electrode swelling as distinguished from the gas swelling can be detected with a high precision. Also, even when an outer casing 21 is made of a robust material such as a metal can, the electrode swelling can be detected with a high precision, so that this is useful in the case of using a robust material in the outer casing. In the case in which the polymer matrix layer 3 is attached to the outer surface of the electrode group 22' in the Z-direction, effects similar to those of the case can be obtained. The polymer matrix layer 3 attached to the outer surface of the electrode group 22' is preferably disposed to be in contact with an inner surface of the outer casing 21.

In the example of FIG. 11, change in the external field accompanying the deformation of the polymer matrix layer 3 attached to each of the plurality of electrode groups 22' is detected by using detection units 4 the number of which is smaller than that of the polymer matrix layers 3. Specifically, two cells 2 in each of which the polymer matrix layer 3 is attached to the side surface of the electrode group 22' are superposed and disposed in the Z-direction, and change in the external field accompanying the deformation of each of the polymer matrix layers 3 is detected with the detection unit 4 that is disposed laterally to the cells. This reduces the number of the detection units 4, and an advantageous effect of space saving or weight reduction is produced, thereby being useful in constructing the assembled battery.

Other Embodiment

In the above-described embodiment, an example in which the rechargeable battery cell is a lithium ion rechargeable battery has been shown; however, the present invention is not limited to this alone. The rechargeable battery cell that is put to use is not limited to a non-aqueous electrolyte rechargeable battery such as a lithium ion battery, but may be an aqueous electrolyte rechargeable battery such as a nickel hydrogen battery.

In the embodiments, an example has been shown in which change in the magnetic field accompanying the deformation of the polymer matrix layer is detected with the detection unit; however, it is possible to adopt a construction in which change in another external field is detected. For example, a construction may be considered in which the polymer matrix layer contains an electroconductive filler such as metal particles, carbon black, or carbon nanotubes as the filler, and the detection unit detects change in the electric field (change in the resistance and the dielectric constant) as the external field.

The present invention is not limited to the embodiment mentioned above, but can be improved and modified variously within the scope of the present invention.

DESCRIPTION OF REFERENCE SIGNS

1 Sealed-type rechargeable battery
2 Cell
3 Polymer matrix layer
4 Detection unit
21 Outer casing
22 Electrode group
23 Positive electrode
24 Negative electrode
25 Separator
26 Electrode terminal
27 Electrode terminal
28a Wall portion
28b Wall portion
28c Wall portion

The invention claimed is:

1. A deformation detection method for a sealed-type rechargeable battery in which an electrode group, which is formed by stacking or winding a positive electrode and a negative electrode with a separator interposed between the positive electrode and the negative electrode, is accommodated in a sealed outer casing, wherein
 a polymer matrix layer is attached to an outer surface of a wall portion of the outer casing that faces the electrode group in a thickness direction of the positive electrode and the negative electrode or in a direction perpendicular to the thickness direction, or a polymer matrix layer is attached to an outer surface of the electrode group in a thickness direction of the positive electrode and the negative electrode,
 the polymer matrix layer contains a filler that is dispersed therein and that changes an external field in response to deformation of the polymer matrix layer, and
 change in the external field accompanying the deformation of the polymer matrix layer is detected by a detection unit.

2. The deformation detection method for a sealed-type rechargeable battery according to claim 1, wherein the polymer matrix layer contains a magnetic filler as the filler, and the detection unit detects change in a magnetic field as the external field.

3. The deformation detection method for a sealed-type rechargeable battery according to claim 1, wherein the polymer matrix layer is attached to an outer surface of a wall portion of the outer casing that is near to an electrode terminal.

4. The deformation detection method for a sealed-type rechargeable battery according to claim 1, wherein change in the external field accompanying the deformation of the polymer matrix layer attached to each of a plurality of the outer casing or a plurality of the electrode group is detected by using the detection units the number of which is smaller than the number of the polymer matrix layers.

5. A sealed-type rechargeable battery in which an electrode group, which is formed by stacking or winding a positive electrode and a negative electrode with a separator interposed between the positive electrode and the negative electrode, is accommodated in a sealed outer casing, comprising a polymer matrix layer and a detection unit, wherein the polymer matrix layer is attached to an outer surface of a wall portion of the outer casing that faces the electrode group in a thickness direction of the positive electrode and the negative electrode or in a direction perpendicular to the thickness direction, or is attached to an outer surface of the electrode group in a thickness direction of the positive electrode and the negative electrode, the polymer matrix layer contains a filler that is dispersed therein and that changes an external field in response to deformation of the polymer matrix layer, and the detection unit detects change in the external field accompanying the deformation of the polymer matrix layer.

6. The sealed-type rechargeable battery according to claim 5, wherein the polymer matrix layer contains a magnetic filler as the filler, and the detection unit detects change in a magnetic field as the external field.

7. The sealed-type rechargeable battery according to claim 5, wherein the polymer matrix layer is attached to an outer surface of a wall portion of the outer casing that is near to an electrode terminal.

* * * * *